July 25, 1967     W. A. RAY     3,332,808
THERMOCOUPLE CONSTRUCTION
Original Filed Dec. 24, 1959
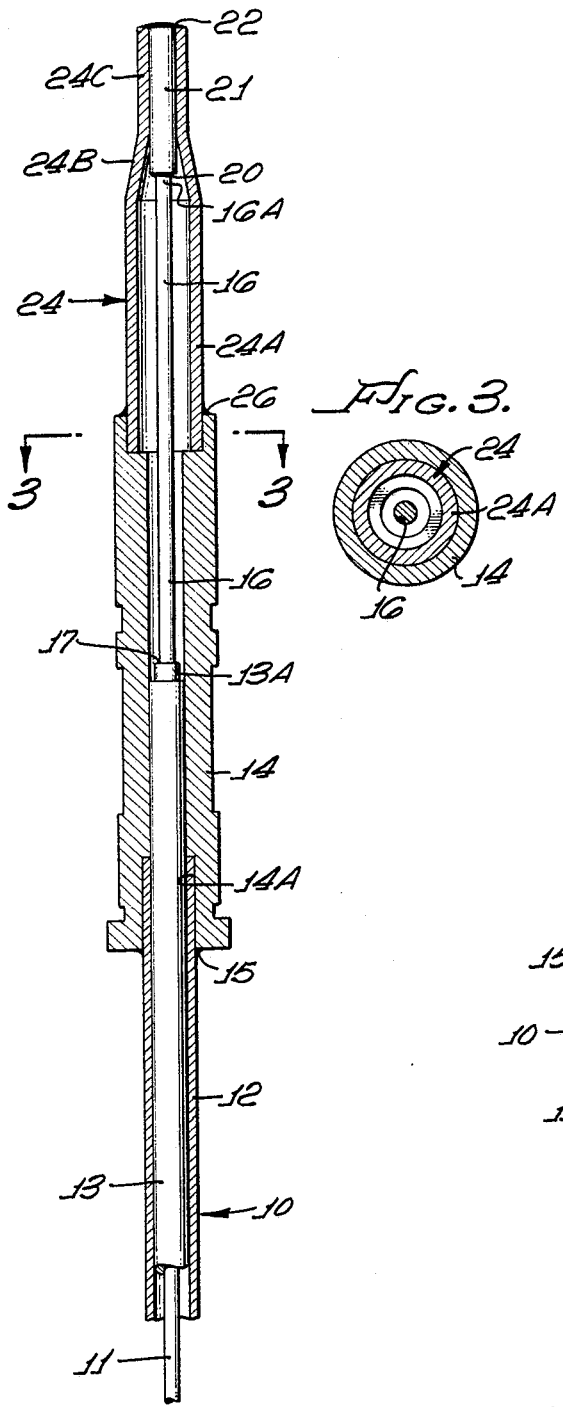
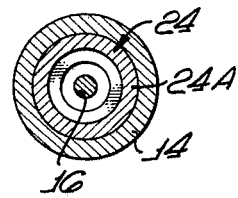
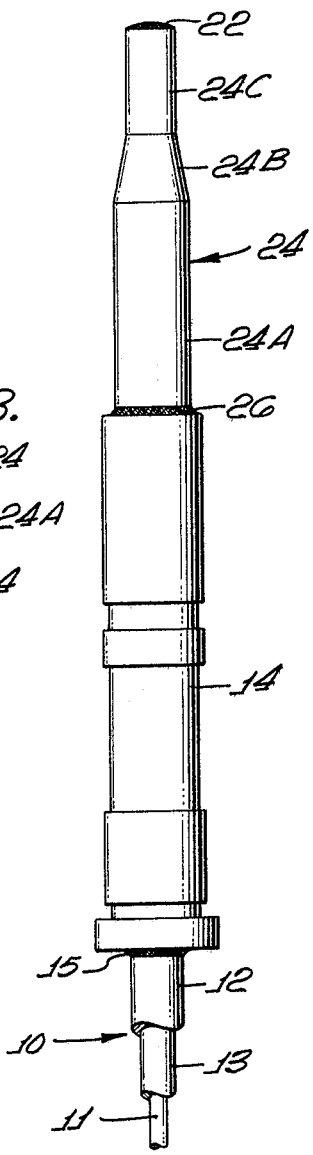
INVENTOR.
WILLIAM A. RAY
BY
ATTORNEYS.

3,332,808
THERMOCOUPLE CONSTRUCTION
William A. Ray, North Hollywood, Calif., assignor to International Telephone and Telegraph Corporation, New York, N.Y., a corporation of Maryland
Continuation of application Ser. No. 861,945, Dec. 24, 1959. This application Oct. 9, 1964, Ser. No. 402,695
4 Claims. (Cl. 136—227)

The present application is a continuation of my pending application Ser. No. 861,945, filed Dec. 24, 1959, entitled, "Thermocouple Construction," and now abandoned.

The present invention relates to improved thermocouple construction particularly useful for measuring or sensing flame temperatures and one which is particularly useful for controlling gas burners and the like.

An object of the present invention is to provide an improved thermocouple construction which is capable of operating satisfactorily in higher temperature environments for a longer period of time than has heretofore been the case, particularly those used in or adjacent a gas flame for sensing or measuring the temperature of the same.

Another object of the present invention is to provide improved thermocouple construction of this character which operates satisfactorily over a long period of time when in or associated with a torch-like pilot flame usually used for igniting a main burner flame.

Another object of the present invention is to provide an improved thermocouple construction of this character which is particularly useful in so-called fail-safe gas controlling burners in which the electromotive force developed by the thermocouple is applied to an electromagnetically operated valve for allowing the flow of gas as long as a pilot flame is present and which shuts off all gas in the event of flame failure.

Another object of the present invention is to provide an improved, less expensive thermocouple construction which at the same time operates to generate its maximum voltage in a short time without substantial time delay.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in elevation of a thermocouple construction embodying features of the present invention.

FIGURE 2 is a longitudinal sectional view through the construction shown in FIGURE 1.

FIGURE 3 is a sectional view taken substantially on the line 3—3 of FIGURE 2.

Referring to the drawings, the electromotive force developed by the thermocouple is applied to an elongated semi-flexible cable 10 which comprises generally an inner copper conductor 11, an outer sheath 12 of copper tubing and insulation 13 insulating the conductors 11 and 12. This cable 10 may extend to terminals of a measuring instrument or control device such as an electromagnetically operated solenoid and the like for utilizing the voltage developed in the thermocouple construction and appearing between the conductors 11 and 12.

The cable 10 extends upwardly into the metal sleeve 14 which may be of suitable material such as copper, brass or stainless steel, it being noted that the copper sheath 12 extends only partly up into the sleeve 14 within a close-fitting cylindrical portion 14A of sleeve 14 and is suitably affixed thereto as, for example, by brazing 15 for mechanical purposes and also for sealing the inner portion of the thermocouple against moisture, air, gases, etc.

The insulation 13 terminates at its end 13A at a region substantially midway between the length of the sleeve 14 as shown at which the lower end of the thermocouple element 16 is welded or brazed at 17 to the inner copper conductor 11. This thermocouple element 16 is a metal known in the trade as Copel, containing approximately 55% copper, 44.4% nickel and .6% magnesium. This Copel rod 16 extends up through the remaining portion of sleeve 14 and a substantial portion of the upper sleeve 24 as shown where it has its end 16A fusion-welded at 20 to the lower end of the thermocouple element 21 in the form of a rod or button 21 of larger diameter than the diameter of the Copel rod 16.

The rod or button 21 is of a metal known as Alumel, containing 95% nickel with the remaining constituting silicon, magnesium and aluminum. The upper end of this button 21 is suitably bonded as, for example, by welding at 22 to the upper end of the stainless steel tube 24 which has, as shown, a relatively large diameter portion 24A adjacent the concentrically disposed rod 16 and which is necked at 24B to provide the upper smaller diameter portion 24C within which is closely fitted the Alumel rod or button 21 to conform with substantially the entire length of the Alumel button 21. The stainless steel sleeve 24 is closely fitted within a cylindrical portion of the sleeve 14 and is suitably secured thereto as, for example, by welding or brazing at 26.

It is seen from this construction that there is a button or slightly elongated portion of Alumel 21 in the top of the construction and that the upper end of the copper conductor 11, which is separated from the button 21 by the Copel rod 16, extends upwardly into the construction a greater distance than is usually conventional. It is further observed that this construction involves the Copel rod connection 16 which has a relatively small area being at least one-half or less than one-half the area of either the diameter of the Alumel button 21 or the copper wire 11 for purposes of obtaining high temperature differential for relatively high voltage generation. It is noted also that the Copel rod 16, which is the sensitive element, is protected from extreme temperatures and thus is capable of operating satisfactorily for a long period of time under relatively high temperature conditions, particularly in the presence of pilot burners having a torch-like flame.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A thermocouple construction comprising a tubular housing comprising two telescoping sleeve-like elements bonded together, a conductor cable having an inner conductor and an outer conductor sheath, said sheath being bonded to one of said sleeve-like elements and the inner conductor of said cable terminating within said one sleeve-like element, a metal rod consisting substantially of 55% copper, 44.4% nickel and 0.6% magnesium having one end thereof bonded to said inner conductor and extending through said one sleeve-like element and a portion of the other sleeve-like element, a short button snugly fitted within and bonded in one end of the other sleeve-like element and having bonded thereto the other end of said metal rod, said button consisting substantially of 95% nickel with the remaining silicon, magnesium and aluminum, said other sleeve-like element being of stainless steel.

2. The construction set forth in claim 1 in which said metal rod is spaced from both of said sleeve-like elements.

3. The construction as set forth in claim 1 in which the area of said metal rod is substantially less than the cross-sectional area of either said button or the inner conductor of said cable.

4. A thermocouple construction comprising a sleeve-like casing, a rod-like element disposed entirely within said casing, a conducting cable having its inner conductor connected to one end of said rod-like element, said cable having a metal sheath bonded to said casing, a button in the form of an elongated cylinder snugly fitted in one end of said casing, said one end of said casing being closed by said button which is bonded to said casing, the other end of said rod-like element being bonded to said button, that portion of said casing to which said button is bonded being of stainless steel, said rod consisting of substantially 55% copper, 44.4% nickel and 0.6% magnesium and said button consisting of substantially 95% nickel with the remaining silicon, magnesium and aluminum.

References Cited

UNITED STATES PATENTS

| | | | |
|---|---|---|---|
| 2,337,000 | 12/1943 | Ray | 136—5 |
| 2,385,530 | 9/1945 | Paille | 136—4 X |
| 2,691,056 | 10/1954 | Wolff | 136—4 |
| 2,858,350 | 10/1958 | Fritts et al. | 136—4 |
| 2,892,591 | 6/1959 | Mathews | 136—4 X |
| 2,961,474 | 11/1960 | Fritts | 136—4 |
| 3,051,767 | 8/1962 | Fredrick et al. | 136—5 |

OTHER REFERENCES

Moffat, R. J.: "Gradient Approach to Thermocouple Circuitry," in Electro-Technology, volume 68, July 1961, page 12.

WINSTON A. DOUGLAS, *Primary Examiner.*

A. M. BEKELMAN, *Assistant Examiner.*